United States Patent
Tsujimura et al.

(10) Patent No.: US 7,355,662 B2
(45) Date of Patent: Apr. 8, 2008

(54) LIQUID CRYSTAL DISPLAY PANEL AND DEVICE THEREOF

(75) Inventors: Takatoshi Tsujimura, Fujisawa (JP); Hiroyuki Kamiya, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 957 days.

(21) Appl. No.: 09/764,621

(22) Filed: Jan. 18, 2001

(65) Prior Publication Data

US 2001/0028422 A1    Oct. 11, 2001

(30) Foreign Application Priority Data

Jan. 20, 2000  (JP)  ............... 2000-012118

(51) Int. Cl.
  *G02F 1/1335*  (2006.01)
  *G02F 1/1343*  (2006.01)
(52) U.S. Cl. ............................ 349/96; 349/141
(58) Field of Classification Search ............ 349/42, 349/43, 96–98, 86, 87, 143, 141, 114
See application file for complete search history.

(56) References Cited

U.S. PATENT DOCUMENTS

| | | | | |
|---|---|---|---|---|
| 4,241,984 A | * | 12/1980 | Leibowitz | 349/96 |
| 6,147,738 A | * | 11/2000 | Okamoto | 349/122 |
| 6,417,899 B1 | * | 7/2002 | Jones et al. | 349/96 |
| 6,686,980 B1 | * | 2/2004 | Ichihashi | 349/96 |

FOREIGN PATENT DOCUMENTS

| | | |
|---|---|---|
| JP | 62-058220 | 3/1987 |
| JP | 03-021904 | 1/1991 |
| JP | 03-105315 | 5/1991 |
| JP | 04-075025 | 3/1992 |
| JP | 07-159778 | 6/1995 |
| JP | 07-270782 | 10/1995 |
| JP | 09-127554 | 5/1997 |
| JP | 09-152626 | 6/1997 |
| JP | 09-230373 | 9/1997 |
| JP | 09-318972 | 12/1997 |
| JP | 09-331066 | 12/1997 |
| JP | 10-020294 | 1/1998 |
| JP | 10-133227 | 5/1998 |
| JP | 10-325951 | 12/1998 |
| JP | 11-084430 | 3/1999 |
| JP | 11-119237 | 4/1999 |
| WO | WO 99/18475 | 4/1999 |

\* cited by examiner

*Primary Examiner*—Dung T. Nguyen
(74) *Attorney, Agent, or Firm*—E. Dwayne Nelson, Esq.; McGinn IP Law Group, PLLC

(57) ABSTRACT

A liquid crystal display capable of improving the brightness without depending on the aperture ratio. By setting a lower polarization plate between an array substrate and a color filter substrate, the light reflected from a metal film formed on the array substrate can directly return to a light guide plate. Therefore, the light recycling efficiency is improved and the brightness of the liquid crystal display is improved.

7 Claims, 12 Drawing Sheets

[Figure 1]
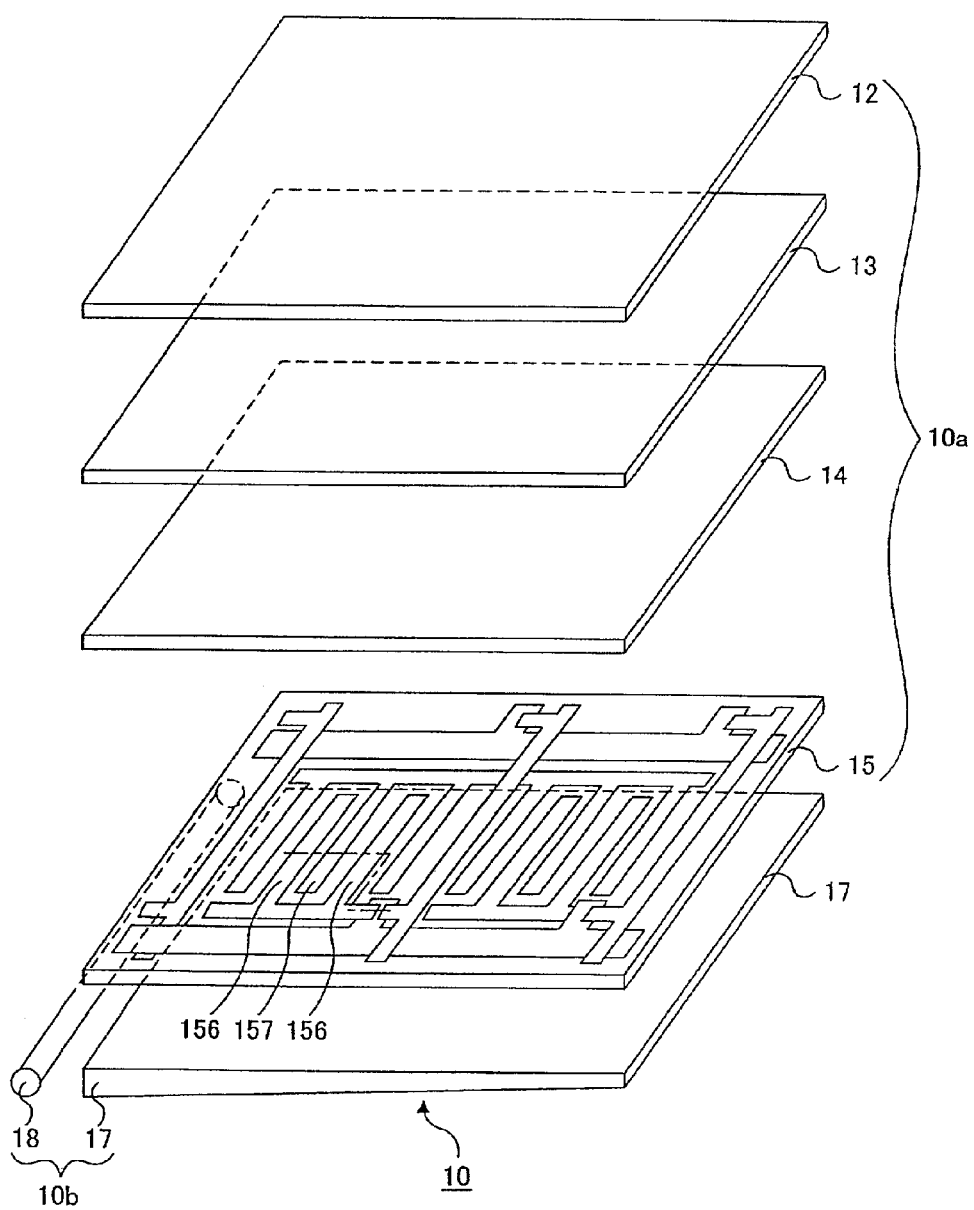

[Figure 2]
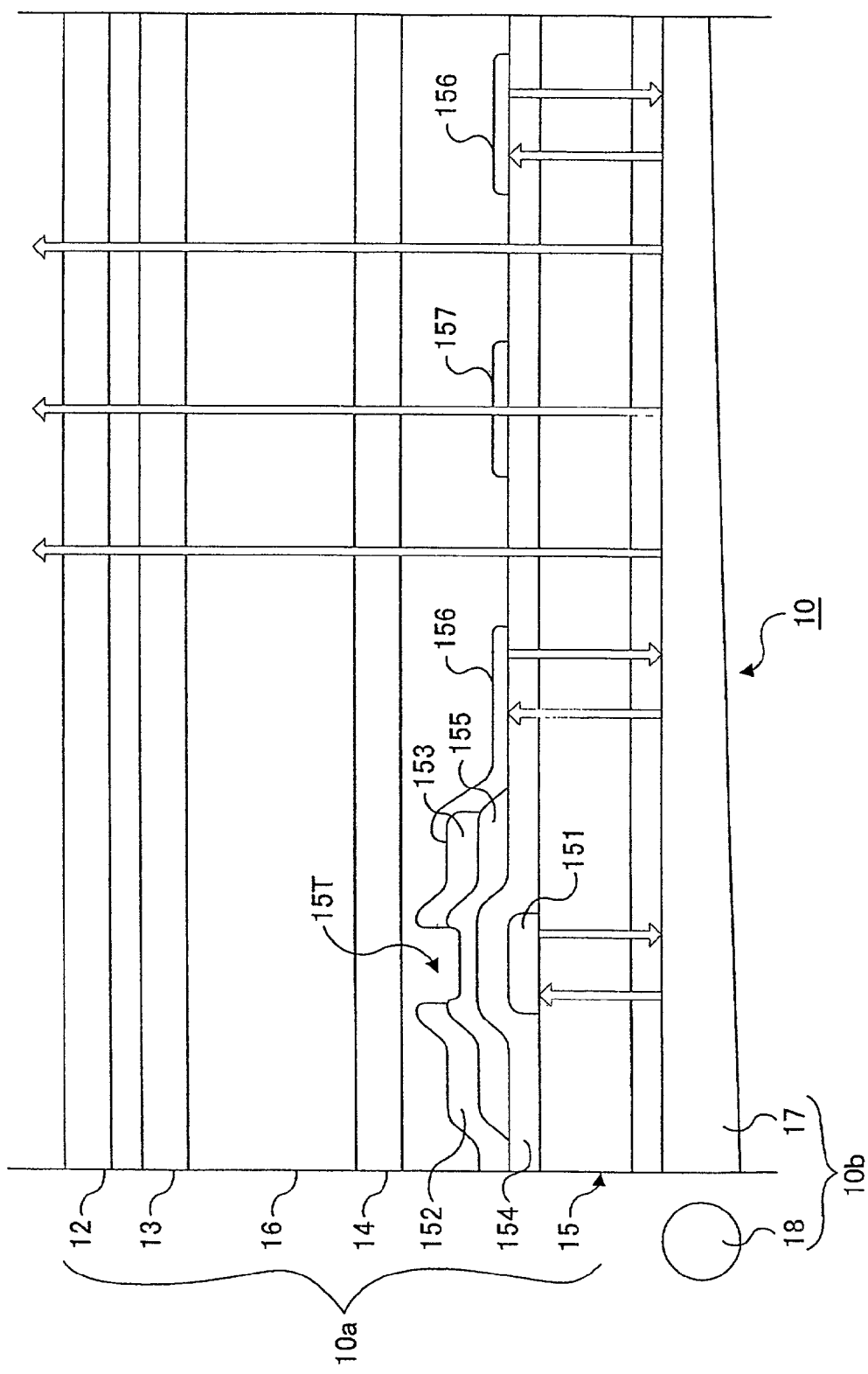

[Figure 3]
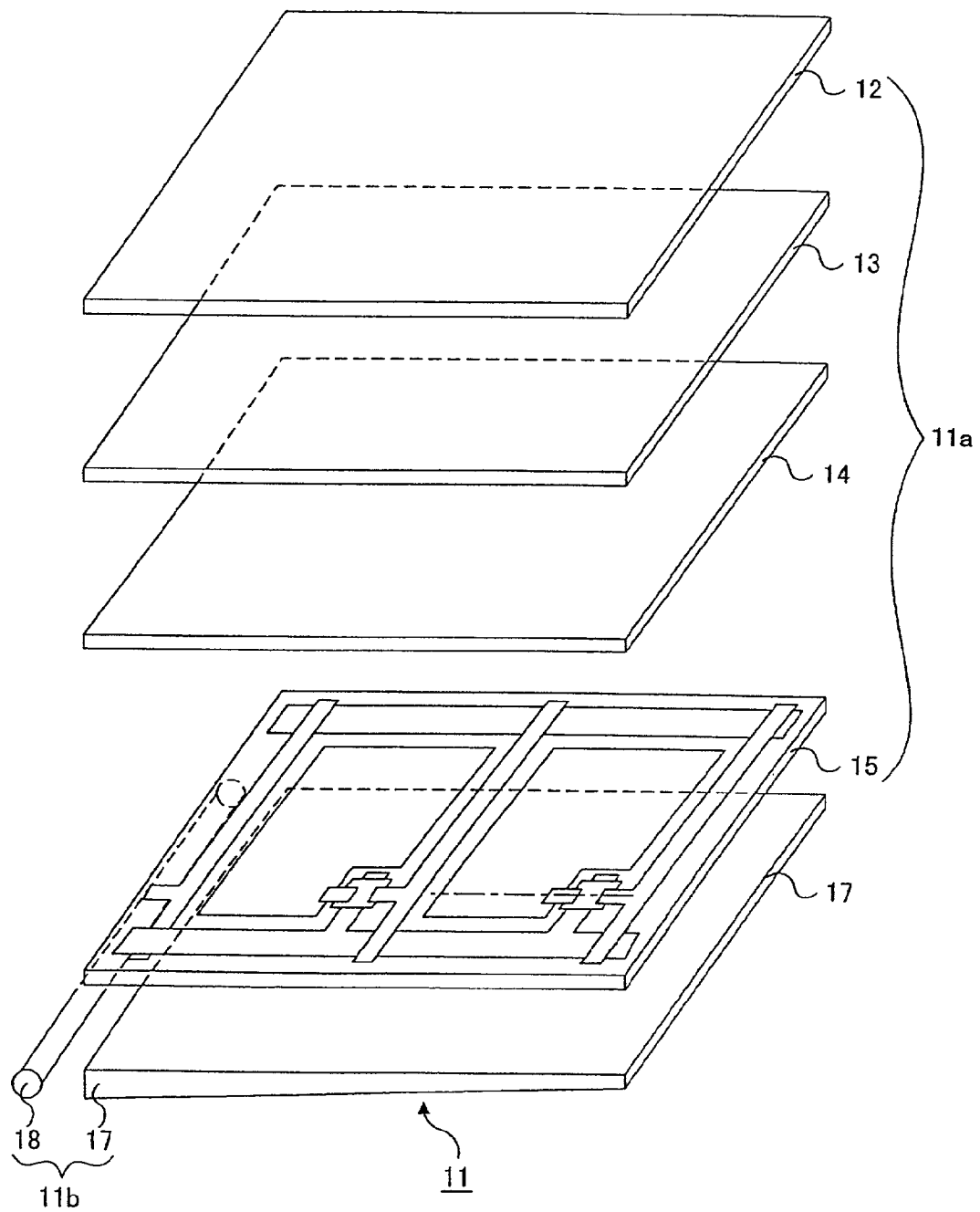

[Figure 4]
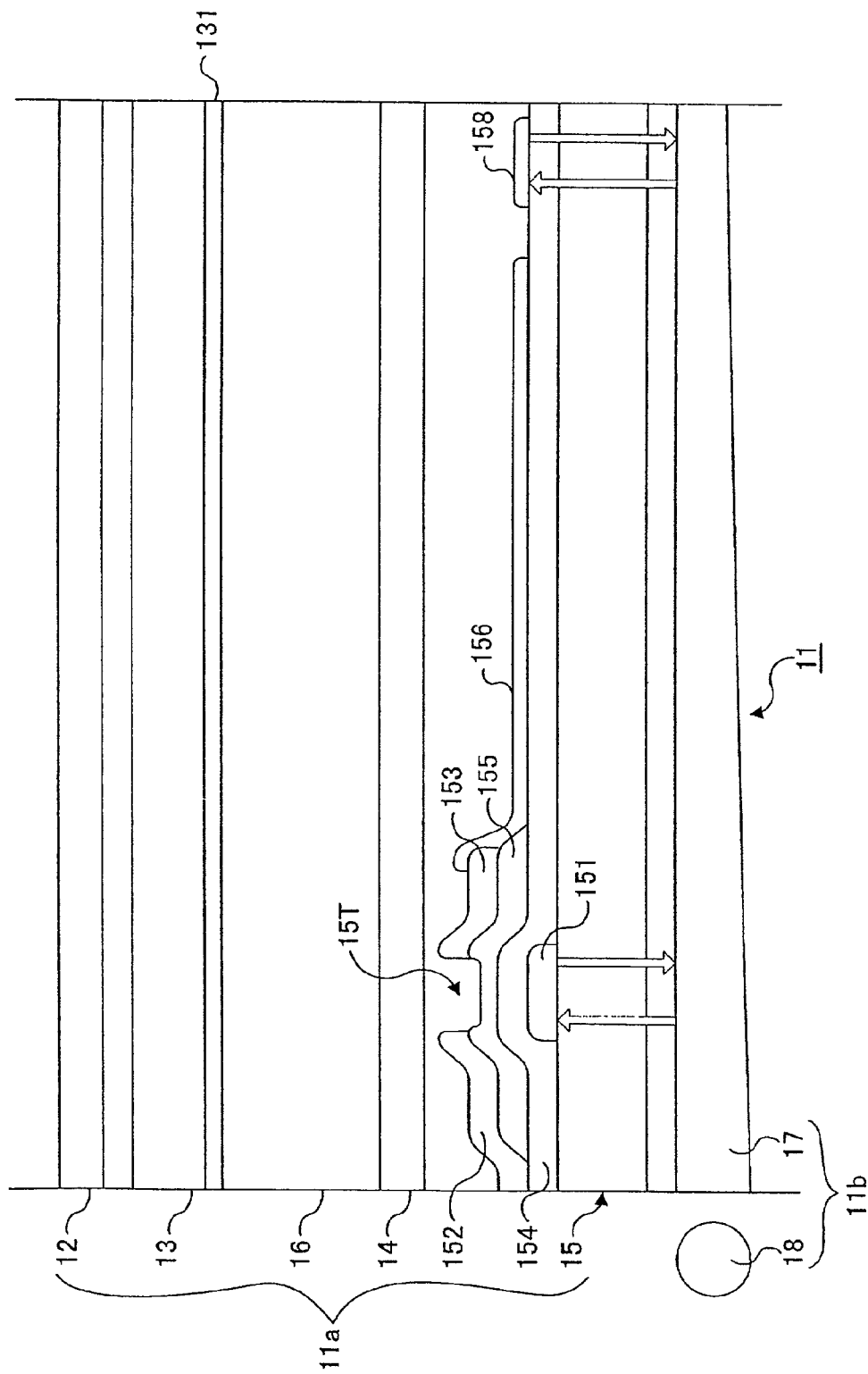

[Figure 5]
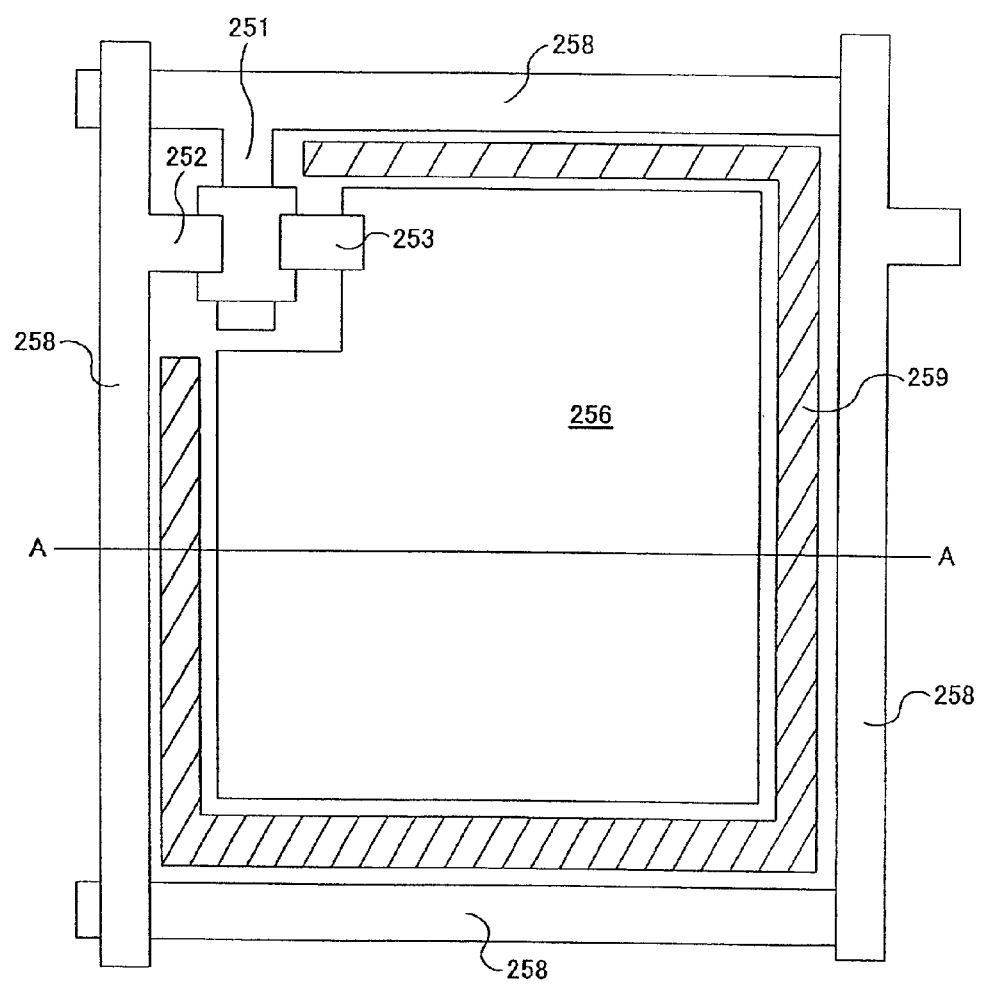

[Figure 6]
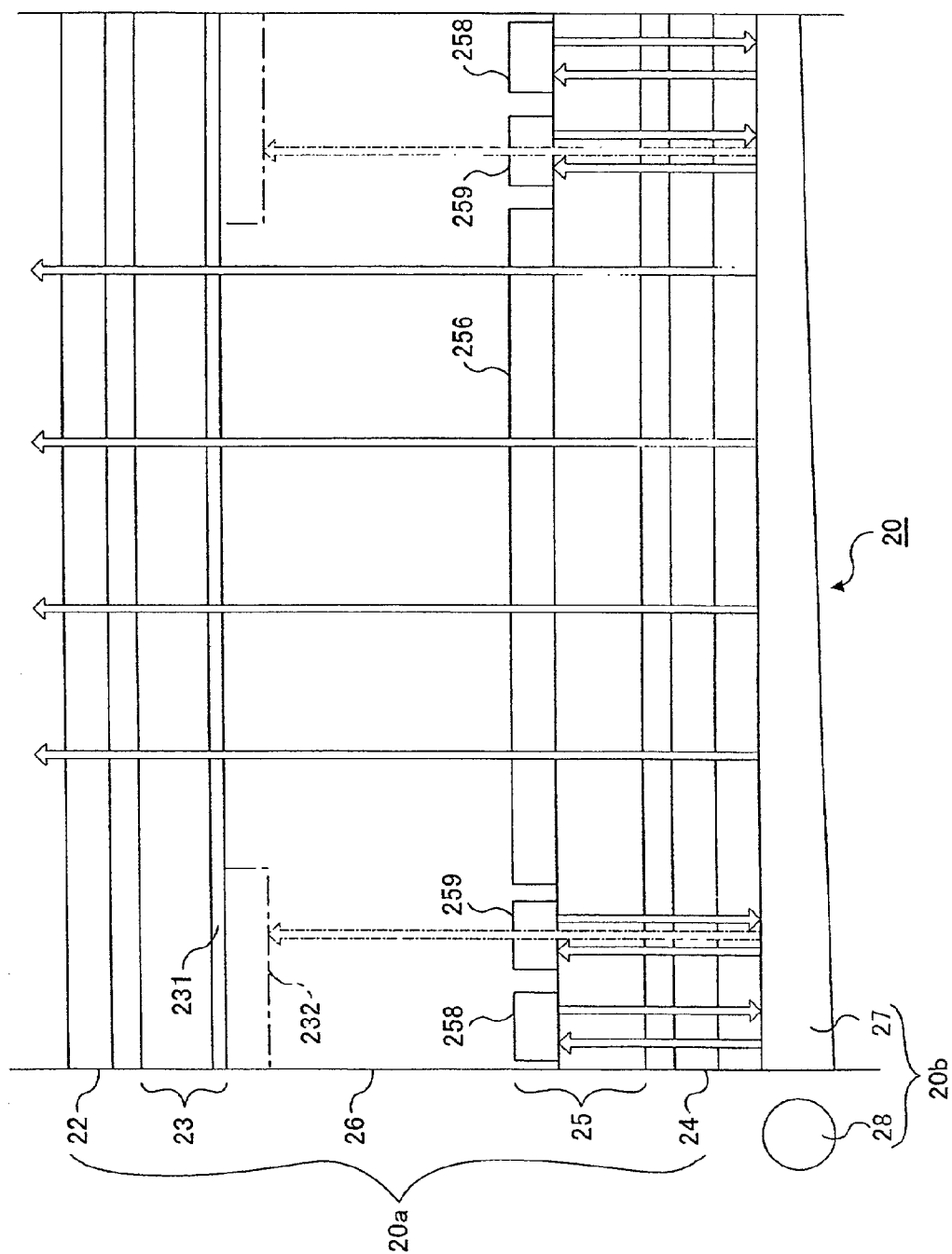

[Figure 7]
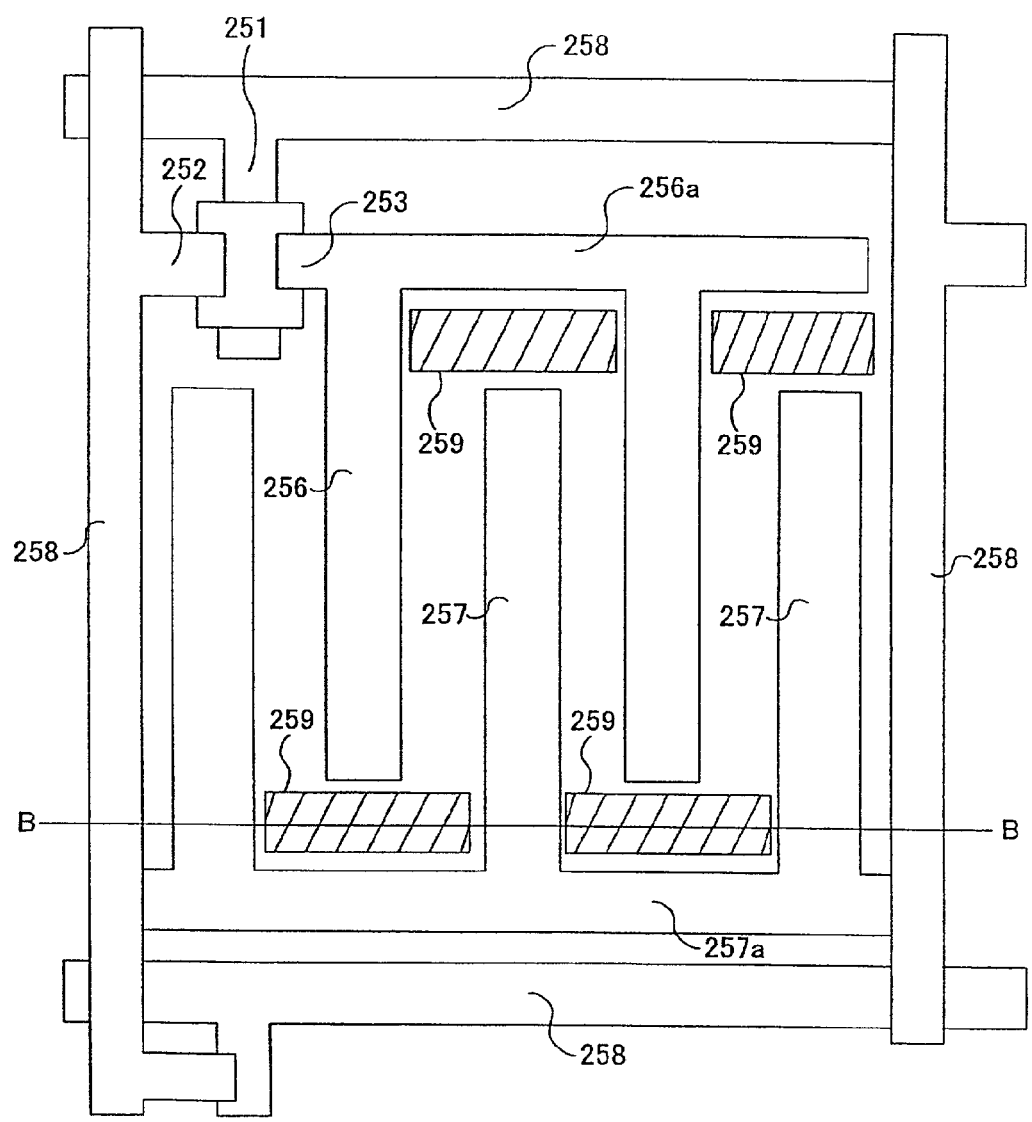

[Figure 8]
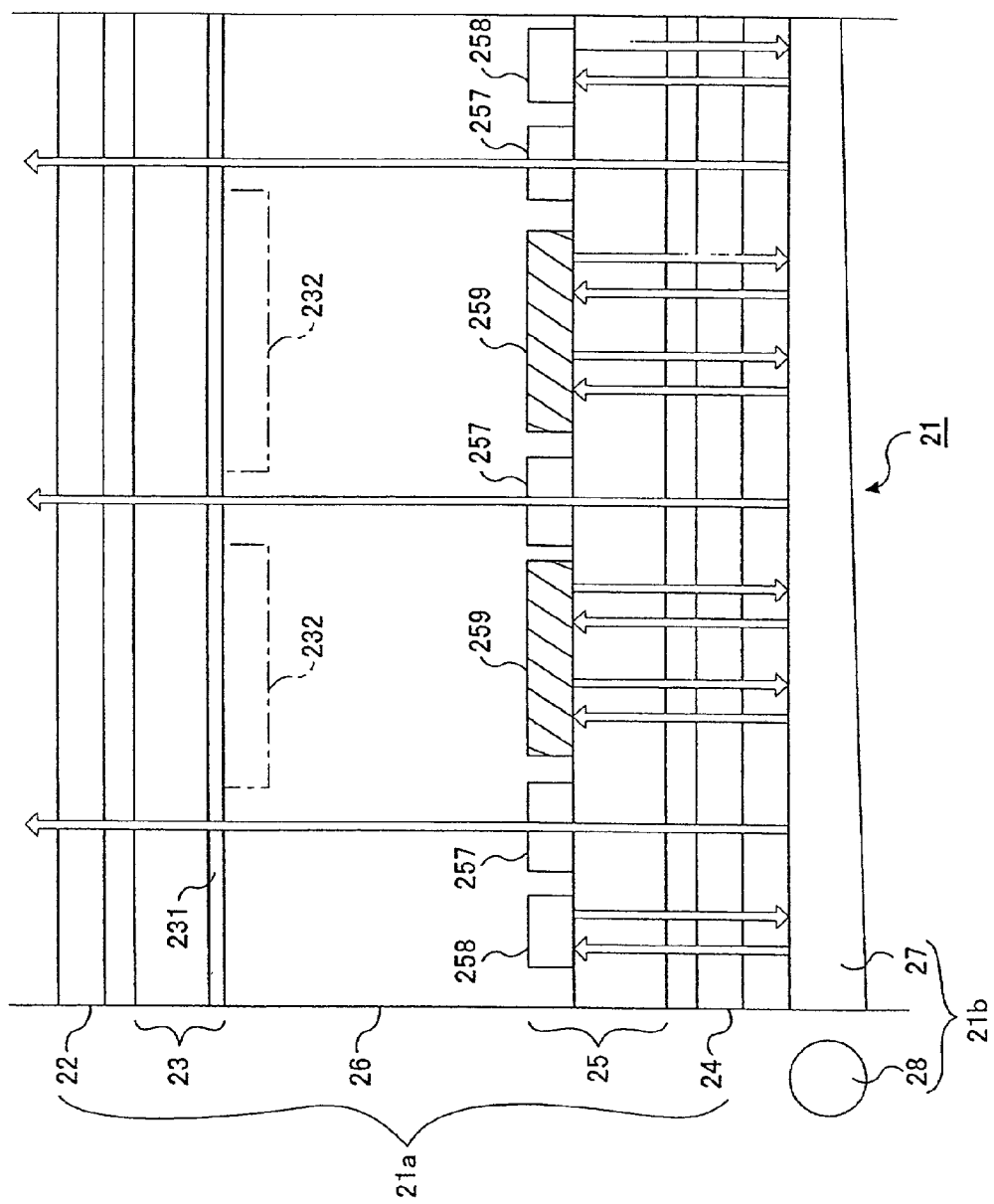

[Figure 9]
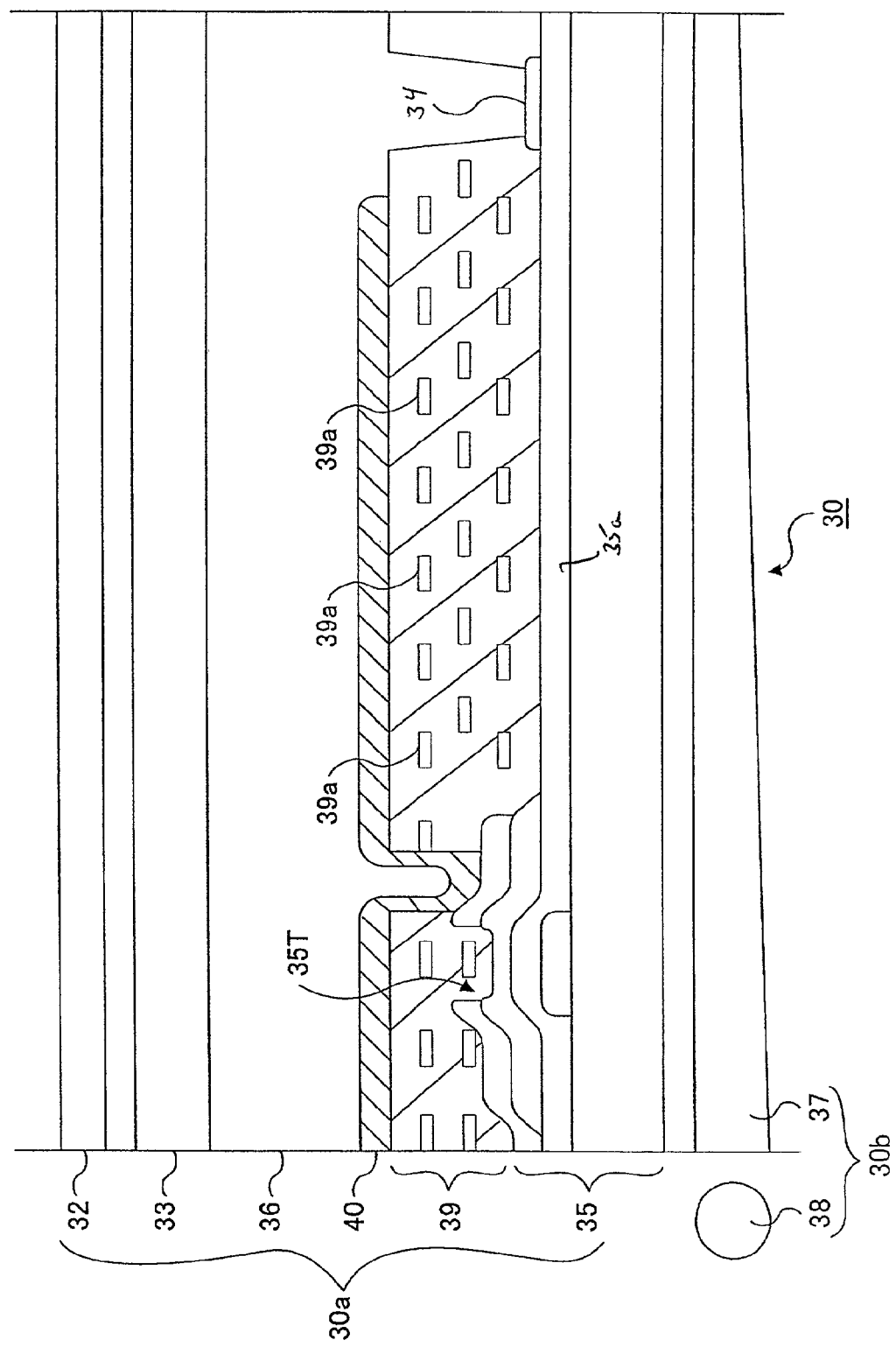

[Figure 10]
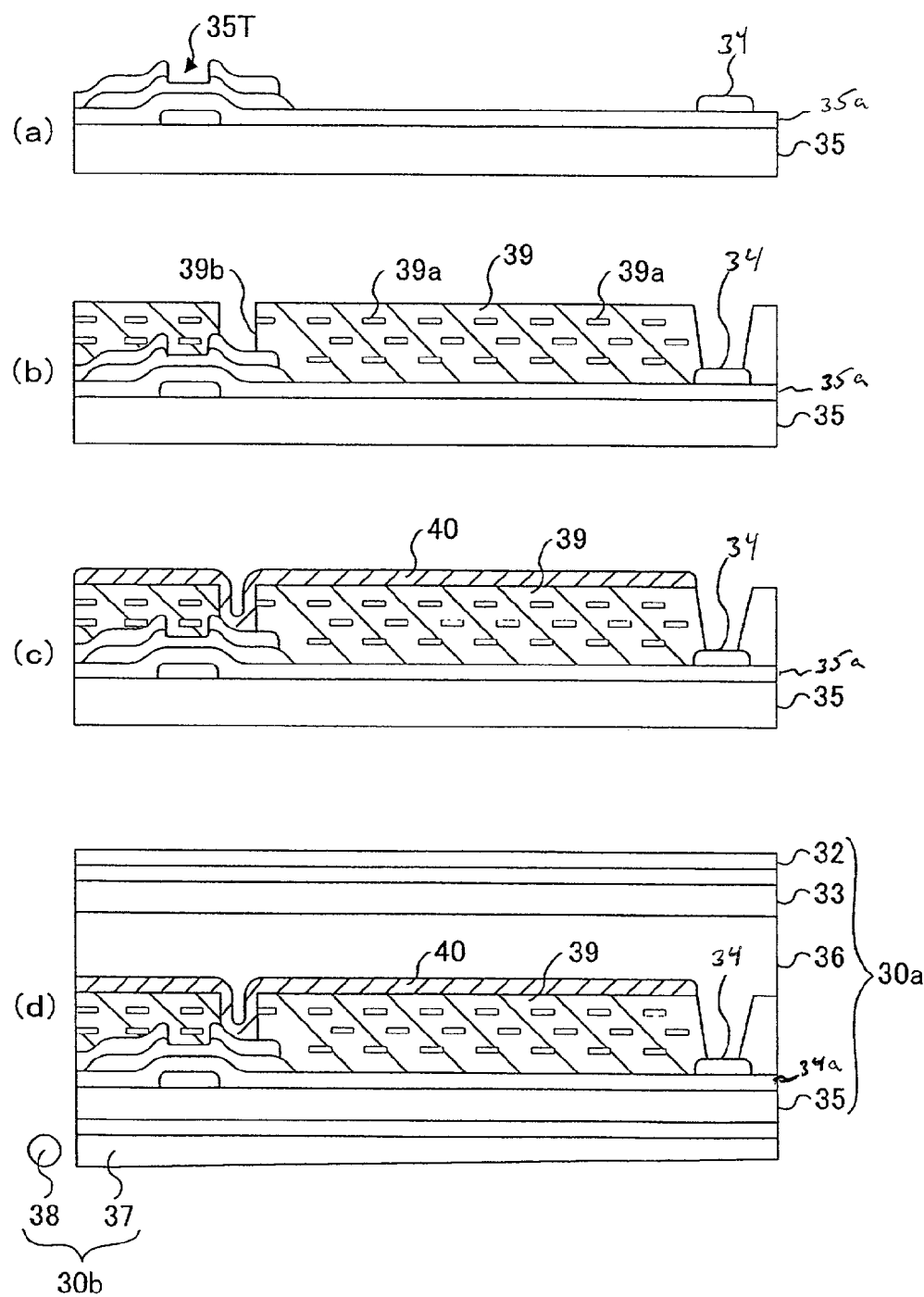

[Figure 11] PRIOR ART
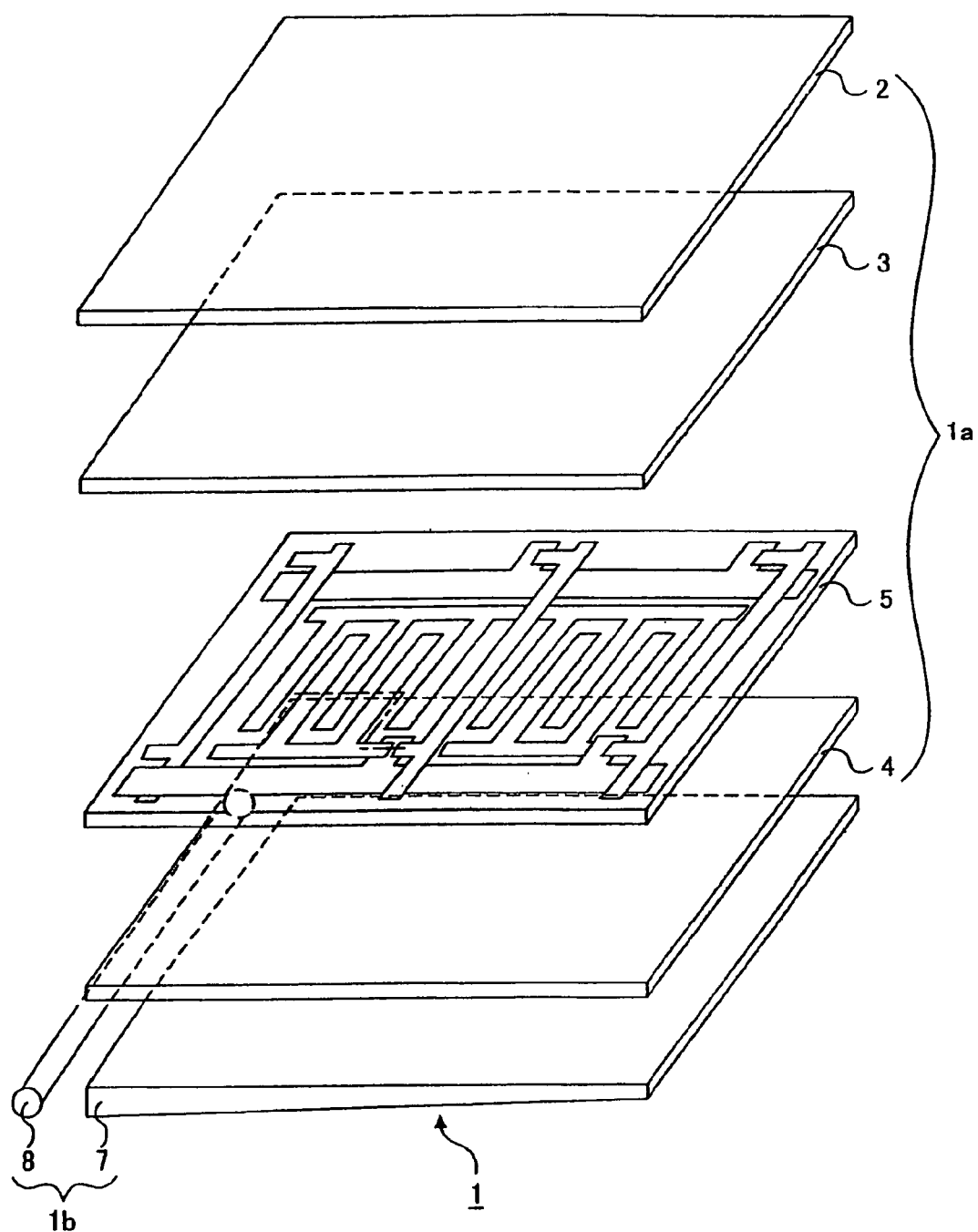

[Figure 12] PRIOR ART
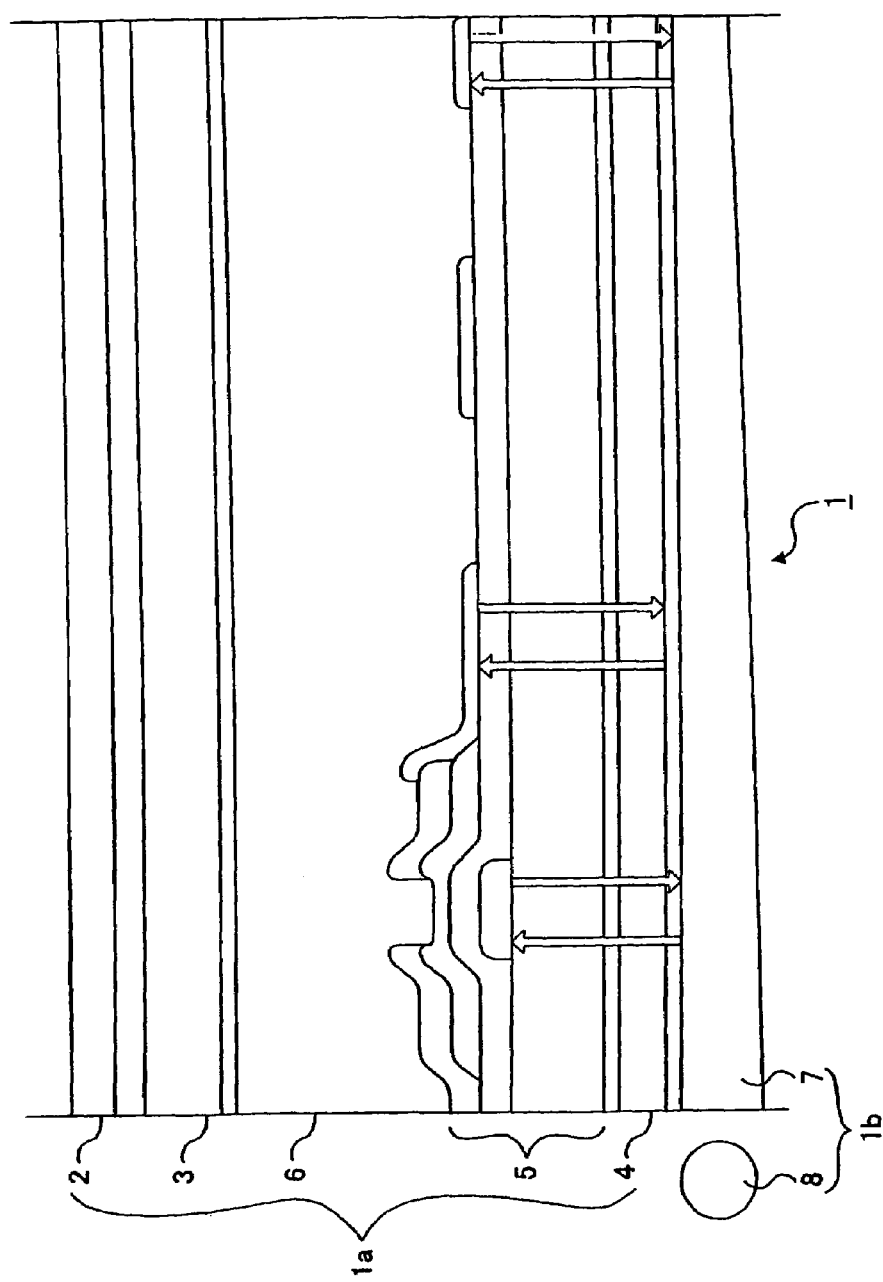

LIQUID CRYSTAL DISPLAY PANEL AND DEVICE THEREOF

FIELD OF THE INVENTION

The present invention relates to a liquid crystal display panel and a liquid crystal display device, particularly to a liquid crystal display panel and a liquid crystal display device capable of obtaining a high brightness even at the same aperture ratio.

BACKGROUND OF THE INVENTION

In the case of a Thin Film Transistor (TFT) liquid crystal display device, the aperture ratio and the angle of visibility are important parameters for controlling the quality of the device.

A recently-developed In-Plane-Switching (IPS)-mode liquid crystal display device attracts a good deal of public attention as a liquid crystal display capable of realizing a very large angle of visibility. The IPS-mode liquid crystal display device generates an electric field in a direction horizontal to the array substrate by forming not only the display electrode but also the common electrode on the array substrate with the TFT formed on it and applying a voltage between the display electrode and the common electrode. Therefore, the liquid crystal material being present between the array substrate and the color filter substrate rotates in a plane while being kept horizontal to both the substrates. As the result, the IPS-mode liquid crystal display realizes an angle of visibility larger than that of the conventional Twisted Nematic (TN)-mode liquid crystal display device.

An IPS-mode liquid crystal display is superior in angle of visibility but it is inferior to the conventional TN-mode liquid crystal display in aperture ratio. A TN-mode liquid crystal display has a display electrode and a common electrode respectively constituted of a thin film made of transparent Indium Tin Oxide (ITO), while an IPS-mode liquid crystal display has a common electrode constituted of an ITO thin film and a display electrode made of a metal film of Aluminum (Al) or Molybdenum Tungsten (MoW). Because the display electrode made of the metallic thin film is opaque, the IPS-mode liquid crystal display has a low aperture ratio. As the aperture ratio lowers, the screen becomes darker. To improve the brightness of the screen, it is necessary to increase the number of backlights or the capacity of the backlight. And then, the liquid crystal display device is increased in size and weight and moreover, increased in power consumption. Therefore, the IPS-mode liquid crystal display having the superior characteristic such as a large angle of visibility is applied to a large liquid crystal display. However, application of the IPS-mode liquid crystal display to a notebook-type personal computer having many restrictions on power consumption, size, and weight has been suspended. Moreover, it can be considered that a large liquid crystal display lowers in the aperture ratio as the minuteness of the liquid crystal display is further improved and it is difficult to apply the IPS-mode liquid crystal display to the large liquid crystal display.

The TN-mode liquid crystal display has a large aperture ratio compared to the IPS-mode liquid crystal display. However, it is needless to say that it is preferable to obtain higher brightness at the same aperture ratio in order to improve the display characteristic and decrease power consumption.

Japanese Published Examined Patent Application No. 60-34095 and Japanese Published Unexamined Patent Application No. 63-121823 respectively disclose a liquid crystal display panel in which a polarization layer is set between two glass substrates. However, neither of them disclose any configuration for improving the light-recycling efficiency.

Therefore, it is an object of the present invention to provide a liquid crystal display panel and a liquid crystal display device capable of improving brightness without depending on the aperture ratio.

SUMMARY OF THE INVENTION

A feature of the present invention includes the liquid crystal display panel superposing an array substrate on which a driving element for controlling a driving voltage and a display electrode to which a voltage is applied through the driving element are formed, a first polarization layer for polarizing the light passing through the array substrate, a liquid crystal layer having a liquid crystal material, a color filter substrate on which a color filter made of a color-material film is formed, and a second polarization layer for polarizing the light passing through the color filter substrate.

By using the above liquid crystal display panel of the present invention, it is possible to provide a liquid crystal display device of the present invention superior in the light-recycling efficiency. That is, another feature of the present invention is that a liquid crystal display device comprises a liquid crystal display panel in which an array substrate and a color filter substrate are arranged to sandwich a liquid crystal layer and a backlight unit for applying light to the liquid crystal display panel from the outside of the array substrate, wherein the light reflected from the array substrate of the liquid crystal display panel directly returns to the backlight unit without passing through the other layer.

The present invention further provides a liquid crystal display device comprising a liquid crystal display panel in which an array substrate and a color filter substrate are arranged to sandwich a liquid crystal layer having a liquid crystal material and a reflection film is formed in an area on the array substrate corresponding to an area in the liquid crystal layer in which the liquid crystal material is oriented to a not-purposed direction when a voltage is applied to the liquid crystal layer and a backlight unit for illuminating the liquid crystal display panel from the outside of the array substrate.

Yet another feature of the present invention also provides a liquid crystal display panel constituted by successively superposing an array substrate on which a driving element for controlling a driving voltage and a display electrode to which a voltage is applied through the driving element are formed, a liquid crystal layer having a liquid crystal material, and a color filter substrate on which a color filter made of a color-material film is formed, wherein a metal film is formed in an area of the array substrate corresponding to an area in which an electric field having a direction different from an original electric-field direction for driving the liquid crystal material is generated.

Still another feature of the present invention provides a liquid crystal display comprising an array substrate provided with an insulating substrate, a thin film transistor formed on the insulating substrate, a polymer layer which covers the insulting substrate and in which polarization elements are dispersed, and a display electrode which is formed on the polymer layer and penetrates the polymer layer and a part of which conductively connects with the thin film transistor; a liquid crystal display panel provided with a color filter substrate set so as to face the array substrate by keeping a predetermined gap with the array substrate and a liquid crystal layer located at the gap between the array substrate and the color filter substrate; and a backlight unit for applying light to the liquid crystal display panel from the outside of the array substrate.

Various other objects, features, and attendant advantages of the present invention will become more fully appreciated as the same becomes better understood when considered in conjunction with the accompanying drawings, in which like reference characters designate the same similar parts throughout the several views.

BRIEF DESCRIPTION OF THE DRAWINGS

FIG. 1 is an exploded perspective view showing a liquid crystal display of the first embodiment of the present invention.

FIG. 2 is a sectional schematic view showing a liquid crystal display of the first embodiment of the present invention.

FIG. 3 is an exploded perspective view showing another liquid crystal display of the first embodiment of the present invention.

FIG. 4 is a sectional schematic view showing another liquid crystal display of the first embodiment of the present invention.

FIG. 5 is an exploded perspective view showing a liquid crystal display of the second embodiment of the present invention.

FIG. 6 is a sectional schematic view showing a liquid crystal display of the second embodiment of the present invention.

FIG. 7 is an exploded perspective view of another liquid crystal display of the second embodiment of the present invention.

FIG. 8 is a sectional schematic view showing another liquid crystal display of the second embodiment of the present invention.

FIG. 9 is a sectional schematic view showing a liquid crystal display of the third embodiment of the present invention.

FIGS. 10A to 10D are illustrations showing the fabrication steps of a liquid crystal display of the third embodiment of the present invention.

FIG. 11 is an exploded perspective view of a conventional liquid crystal display.

FIG. 12 is a sectional schematic view of the conventional liquid crystal display.

DETAILED DESCRIPTION ON THE INVENTION

It can be said that the brightness of the conventional liquid crystal display depends on the aperture ratio. That is, as long as specifications of the backlight and the like are made constant, it is necessary to increase the aperture ratio in order to improve the brightness. However, the present inventors notice that it is possible to improve the brightness without increasing the aperture ratio by improving the light-recycling efficiency. The above mentioned will be explained below by referring to FIGS. 11 and 12 showing the conventional IPS-mode liquid crystal display 1.

As shown in FIGS. 11 and 12, the conventional liquid crystal display 1 is constituted of a liquid crystal display panel 1a obtained by superposing an upper polarization plate 2 serving as a second polarization layer, a color filter substrate 3, an array substrate 5, and a lower polarization plate 4 serving as a first polarization layer and a backlight unit 1b comprising a light guide plate 7 and a light source 8 in order from the top of FIG. 11 or 12. Circumferences of the color filter substrate 3 and the array substrate 5 are respectively sealed by a (not-illustrated) sealing material and a liquid crystal layer 6 filled with a liquid crystal material is constituted in the formed space.

The light emitted from the light source 8 passes through the light guide plate 7 and then, passes through the lower polarization plate 4, and is applied to the array substrate 5. The light applied to a portion constituted of a wiring and another metal film formed on the array substrate 5 out of the applied light reflects as shown by arrows in FIG. 12, passes through the lower polarization plate 4 again, and returns to the light guide plate 7. The light returned to the light guide plate 7 is applied to the lower polarization plate 4 again from the light guide plate 7. This is the recycling of light.

In the case of the recycling of light, the light reflected from a metal film formed on the array substrate 5 is applied toward the lower polarization plate 4 again from the light guide plate 7. Therefore, to improve the efficiency of the recycling of light, it is necessary to completely return the reflected light to the light guide plate 7. As a result of studying the conventional IPS-mode liquid crystal display 1 shown in FIGS. 11 and 12 from the above viewpoint, it is considered that the lower polarization plate 4 is an obstacle because the polarization plate has the characteristic of absorbing light. That is, because the light outgoing from the light guide plate 7 passes through the lower polarization plate 4 again before it is reflected from the metal film formed on the array substrate 5 and returns to the light guide plate 7, most of the reflected light is absorbed by the lower polarization plate 4 and wasted. However, if it is possible to reduce absorption of the reflected light on the lower polarization plate 4, it is possible to improve the light-recycling efficiency.

Therefore, the present invention can improve the light-recycling efficiency by using a structure in which reflected light does not pass through the lower polarization plate 4 while the light returns to the light guide plate 7. In particular, the present inventors have an idea of setting a lower polarization plate 14 on an array substrate 15 as shown in FIG. 1 because reflected light does not pass through the lower polarization plate 4 again, on the other hand, the lower polarization plate 4 has been set so far between the light guide plate 7 and the array substrate 5 conventionally. As described in detail in the embodiments of the present invention, it is confirmed that the brightness can be improved by approx. 15% by changing the arrangement of the lower polarization plate 4.

The above liquid crystal display panel of the present invention can be applied to both an IPS-mode liquid crystal display panel and a TN-mode liquid crystal panel. When applying the liquid crystal display panel of the present invention to the IPS-mode liquid crystal display panel, the electric field having the direction parallel with the array substrate is generated by applying the voltage between the display electrode and a common electrode because the common electrode is formed on the array substrate. Moreover, when applying the liquid crystal display panel to the TN-mode liquid crystal display panel, the electric field having the direction vertical to the array substrate is generated by applying the voltage between the display electrode and the common electrode because the common electrode is formed on the color filter substrate.

As a specific mode of a liquid crystal display device of the present invention, a polarization layer is set between the array substrate and the color filter substrate of the liquid crystal display panel and the light reflected from the array substrate returns to the backlight unit without passing through the polarization layer. Therefore, it is possible to realize the configuration in which the backlight unit has the high light-recycling efficiency. By using the configuration, it is possible to improve the brightness compared to the case of the liquid crystal display constituted so that the light reflected from the array substrate out of the light emitted from the backlight unit returns to the backlight unit after passing through the polarization plate. As described above, it is confirmed that the brightness is improved up to 15%.

Moreover, a backlight of a liquid crystal display of the present invention can use the edge-light type which comprises a light source for emitting light and a light guide plate for guiding the light emitted from the light source to the liquid crystal display panel. The edge-light-type backlight unit is applied to a liquid crystal display for a notebook personal computer. Therefore, by using the edge-light-type backlight unit for the liquid crystal display of the present invention, it is possible to apply an IPS-mode liquid crystal display having been applied to the large liquid crystal display so far to the notebook personal computer.

In the case of the conventional TN-mode TFT liquid crystal display panel, disclination occurs around the display electrode, in which the liquid crystal material is oriented to a not-purposed direction even if applying the voltage to the liquid crystal layer. Because the disclination portion deteriorates display quality, a black matrix for interrupting light is provided for the portion corresponding to the disclination portion on the color filter substrate so as to display no object. Because the black matrix absorbs light, absorbed light is wasted. Therefore, in the present invention, the conception is created of positively using the light absorbed by the black matrix. That is, the conception is created of reflecting the light applied to the portion on which the black matrix has been formed so far, in other words, the disclination portion in which the liquid crystal material is oriented to a not-purposed direction even if applying the voltage to the liquid crystal layer and recycling it.

It is not needless to say that a liquid crystal display of the present invention can be applied not only to the TN-mode liquid crystal display but also to the IPS-mode liquid crystal display.

As for the TN-mode liquid crystal display, a display electrode and a wiring conductively connected to the display electrode are formed on the array substrate and disclination occurs at the gap between the display electrode and the wiring. Therefore, it is permitted to form the reflection film at the gap between the display electrode and the wiring.

Moreover, it is preferable to constitute the liquid crystal display panel so that a polarization layer is formed between the array substrate and the color filter substrate. This is because light recycling efficiency is deteriorated when the polarization plate is present between the array substrate and the backlight unit as previously described.

The reflection film can use any film made of metal such as Al, MoW or the like.

By the way, a liquid crystal display panel referred to as the Polymer Film on Array (PFA) type has recently been developed. The present invention can be applied to the PFA-type liquid crystal display panel. That is, in the case of the PFA-type liquid crystal display panel, it is possible to avoid absorption of the reflected light by the lower polarization plate set between the light guide plate and the array substrate of the PFA-type liquid crystal panel by disusing the lower polarization plate and dispersing polarization elements into the polymer layer.

According to the above liquid crystal display of the present invention, polarization elements are dispersed into the resin layer and the resin layer serves as the polarization layer. The light reflected from the array substrate out of the light emitted from the backlight unit can completely return to the backlight unit because no polarization layer is present between the backlight unit and the array substrate. Therefore, it is possible to improve the brightness.

It is enough to set the display electrode only in the display area in each pixels. However, in the case of the liquid crystal display of the present invention, it is preferable to cover the thin film transistor through the resin layer by extending the display electrode. In the case of the conventional liquid crystal display, the liquid crystal molecule nearby the thin film transistor may be oriented to a not-purposed direction because of being influenced by the thin film transistor. However, by using the structure of covering the thin film transistor with the display electrode, even the liquid crystal molecule nearby the thin film transistor is oriented to the direction conforming to the voltage applied to the display electrode without being influenced by the thin film transistor.

Continuing with the detailed description, FIG. 1 is an exploded perspective view of a liquid crystal display 10 of this embodiment and FIG. 2 is a sectional schematic view of the display 10 in FIG. 1. FIG. 2 shows a cross section of the portion shown by the alternate long and short dash line in FIG. 1.

The liquid crystal display 10 shown in FIGS. 1 and 2 is an IPS-mode liquid crystal display using an edge-light-type backlight.

As shown in FIGS. 1 and 2, the liquid crystal display 10 comprises a liquid crystal display panel 10a obtained by superposing an upper polarization plate 12 serving as a second polarization layer, a color filter substrate 13, a lower polarization plate 14 serving as a first polarization layer, and an array substrate 15 and a backlight unit 10b constituted of a light guide plate 17 and a light source 18 in order from the top of FIG. 1. Circumferences of the color filter substrate 13 and the array substrate 15 are sealed with a not-illustrated sealing material and a liquid crystal layer 16 made of a liquid crystal material is constituted in the formed space.

As shown in FIG. 2, a gate insulating film 154 is formed on the upper side of the array substrate 15. A gate electrode 151 is formed in the gate insulating film 154 and an a-Si film 155 is formed on the gate insulating film 154. A source electrode 152 and a drain electrode 153 are formed on the a-Si film 155 serving as a thin-film semiconductor to constitute a thin film transistor 15T serving as a liquid crystal-material driving element. A display electrode 156 is extended from the drain electrode 153 and a common electrode 157 is formed on the gate insulating film 154.

By applying a voltage to the gate electrode 151, current flows from the source electrode 152 to the drain electrode 153 and vice versa because electrons pass through the a-Si film 155. By applying an off-voltage to the gate electrode 151, the source electrode 152 is disconnected from the drain electrode 153. That is, the gate electrode 151 has a function for turning on/off the thin film transistor 15T serving as a switching element. In this case, the voltage is applied to the display electrode 156 from the drain electrode 153 and the electric field is generated in the direction parallel with the array substrate 15 between the electrode 156 and the common electrode 157 set by keeping the predetermined distance from the electrode 156. Therefore, the liquid crystal material in the liquid crystal layer 16 rotates in a horizontal plane.

In this case, the gate electrode 151, source electrode 152, drain electrode 153, and display electrode 156 are respectively constituted of a metal film made of Al or Tantalum (Ta). Moreover, the common electrode 157 is constituted of a transparent Indium Tin Oxide (ITO) film.

In the above liquid crystal display 10, the light emitted from the light guide plate 17 of the backlight unit 10b advances along arrows in FIG. 2. The light applied to portions of the substrate comprising metal films such as the gate electrode 151 and display electrode 156 is reflected and returns to the guide plate 17 of the backlight unit 10b. Other light passes through the array substrate 15, lower polarization plate 14, liquid crystal layer 16, color filter substrate 13, and upper polarization plate 12, in that order.

In the case of the above-described liquid crystal display 10, because the lower polarization plate 14 is set between the color filter substrate 13 and the array substrate 15, the light reflected from the array substrate 15 can directly return to the light guide plate 17 without passing through the lower polarization plate 14 as shown in FIG. 2. The light reflected from the array substrate 15 can return to the light guide plate 17 while keeping its luminous energy. Therefore, the display 10 is superior in light-recycling efficiency compared to the conventional liquid crystal display 1 shown in FIGS. 11 and 12 in which light returns to the light guide plate 7 after passing through the lower polarization plate 4. In the case of the IPS-mode liquid crystal display 10, the quantity of the light reflected from the array substrate 15 is more than that of a TN-mode liquid crystal display whose display electrode is constituted of a transparent ITO film because the display electrode 156 of the display 10 is constituted of a metal film. Therefore, it can be said that the IPS-mode liquid crystal display 10 has a large light-recycling effect, that is, a large brightness improvement effect by setting the lower polarization plate 14 between the color filter substrate 13 and the array substrate 15.

A case of specifically confirming the above effect is described. That is, as shown in Table 1, brightness of a glass substrate, an array substrate, a conventional IPS-mode liquid crystal display, and an IPS-mode liquid crystal display of this embodiment are measured by using a light source having the brightness of 2144 (cd/m$^2$). The array substrate is made by using the glass substrate. Moreover, the conventional IPS-mode liquid crystal display and the IPS-mode liquid crystal display of this embodiment respectively use the array substrate and have the same configuration except that positions of lower polarization plates are different from each other.

As shown in Table 1, the brightness of the conventional IPS-mode liquid crystal display, that is, the array substrate is equal to 535.8 (cd/m$^2$) when the light reflected from the conventional IPS-mode liquid crystal display or the array substrate returns to the light guide plate after passing through the polarization plate. However, the brightness of the IPS-mode liquid crystal display of this embodiment is equal to 622.4 (cd/m$^2$) when the light reflected from the array substrate directly returns to a light guide plate without passing through the other layers including the polarization plate. Thus, it is confirmed that the brightness is improved by 16%. The improvement of the brightness corresponds to the fact that an aperture ratio is improved from 40% to 46% or from 50% to 57.5%. Therefore, it is found that the effect is very large.

TABLE 1

| Measuring object | Brightness (cd/m$^2$) |
| --- | --- |
| Light source | 2144 |
| Glass substrate | 2095 |
| Array substrate | 1364 |
| Conventional IPS-mode liquid crystal display | 535.8 |
| IPS-mode liquid crystal display of this embodiment | 622.4 |

Also in the case of the TN-mode liquid crystal display, it is, of course, effective to set the lower polarization plate 14 between the color filter substrate 13 and the array substrate 15. The case of applying the present invention to the TN-mode liquid crystal display 11 will be described below mainly about differences from the IPS-mode liquid crystal display 10 by referring to FIGS. 3 and 4. FIG. 3 shows an exploded perspective view when applying the present invention to the TN-mode liquid crystal display 11 and FIG. 4 shows a sectional schematic view of the display 11 in FIG. 3. FIG. 4 shows a cross section of the portion shown by the alternate long and short dash line in FIG. 3. Moreover, in FIGS. 3 and 4, a portion same as that in FIGS. 1 and 2 is provided with the same symbol and its description is omitted.

The IPS-mode liquid crystal display 10 is different from the TN-mode liquid crystal display 11 in that the display electrode 156 and the common electrode 157 are formed on the array substrate 15 in the case of the display 10 but the display electrode 156 is formed on the array substrate 15 and the common electrode 131 is formed on the color filter substrate 13 in the case of the display 11. Therefore, the electric field is generated in a direction parallel with the array substrate 15 in the case of the IPS-mode liquid crystal display 10 while the electric field is generated in a direction vertical to the array substrate 15 in the case of the TN-mode liquid crystal display 11. Moreover, the display electrode 156 of the IPS-mode liquid crystal display 10 is made of a metal film but the display electrode 131 of the TN-mode liquid crystal display 11 is made of a transparent conductive film such as ITO or the like. Therefore, the TN-mode liquid crystal display 11 has the aperture ratio larger than that of the IPS-mode liquid crystal display 10.

In the case of the TN-mode liquid crystal display 11 having a large aperture ratio, the quantity of the light reflected from the array substrate 15 is smaller than the case of the IPS-mode liquid crystal display 10. However, light is reflected from the gate electrode 151 of the thin film transistor 15T or the wiring 158 and returns to the light guide plate 17 as shown in FIG. 4. Therefore, it is found that it is also effective for the TN-mode liquid crystal display 11 to set the lower polarization plate 14 between the color filter substrate 13 and the array substrate 15 in order to improve the recycling effect of the light reflected from these portions.

A liquid crystal display is described in which a reflection film is formed in the area on the array substrate corresponding to the area in the liquid crystal layer in which the above liquid crystal material is oriented to a not-purposed direction when applying the voltage to the liquid crystal layer.

FIGS. 5 and 6 are illustrations showing a case of applying the present invention to the TN-mode liquid crystal display 20, in which FIG. 5 is a top view showing a single pixel on the array substrate and FIG. 6 is a schematic view of the section A-A' in FIG. 5.

As shown in FIG. 6, the liquid crystal display 20 comprises a liquid crystal display panel 20a obtained by superposing an upper polarization plate 22, a color filter substrate 23, a liquid crystal layer 26, an array substrate 25, and a lower polarization plate 24 and a backlight unit 20b constituted of a light source 28 and a light guide plate 27 in order from the top of FIG. 6. A common electrode 231 made of ITO is formed on a plane facing the liquid crystal layer 26 of the color filter substrate 23.

As shown in FIGS. 5 and 6, a gate electrode 251, a source electrode 252, and a drain electrode 253 are formed on the upper face of the array substrate 25.

It is possible to define on the array substrate 25 an area enclosed by a wiring 258 conductively connected to the source electrode 252 and the drain electrode 253 as the unit of a pixel in which a display electrode 256 conductively connected with the drain electrode 253 is formed. The display electrode 256 is made of a transparent conductive film such as ITO as described above.

The display electrode 256 is separate from the wiring 258 by the predetermined interval on the surfaced of the array substrate 25. Because the electric field is generated between the display electrode 256 and the wiring 258 on the portion of the predetermined interval, the liquid crystal material present in the interval is oriented to a not-purposed direction. That is, the TN-mode liquid crystal display 20 controls driving of the liquid crystal material by applying the voltage between the display electrode 256 on the array substrate 25 and the common electrode 231 on the color filter substrate 23 and thereby generating the electric field. The electric field is oriented to the direction vertical to the array substrate 25. However, because then electric field generated between the display electrode 256 and the wiring 258 is oriented to a direction parallel with the array substrate 25, the direction of the electric field is different from the original direction of the electric field for driving the liquid crystal material. Therefore, the liquid crystal material driven by the electric field generated between the display electrode 256 and the wiring 258 is oriented to a direction different from the originally purposed direction, that is, a not-purposed direction. This is referred to as disclination. Therefore, because the portion of the disclination deteriorates a display characteristic, a black matrix 232 shown by the alternate long and short dash line in FIG. 6 has been provided for the corresponding portion on the color filter substrate 23 to exclude the portion from display objects.

In the case of the liquid crystal display 20, it is proposed not only to prevent light from passing through the gap between the display electrode 256 and the wiring 258 on the array substrate 25, that is, passing through an area in which the liquid crystal material is oriented to a not-purposed direction but also to recycle light by positively reflecting the light and returning it to the light guide plate 27. That is, the liquid crystal display 20 is constituted so as to reflect the light emitted from the light guide plate 27 by a reflection film 259 made of a metal film such as Al formed on the array substrate 25 and return the light to the light guide plate 27.

FIG. 6 shows progress of the light emitted from the light guide plate 27 by arrows. The light passes through the portion on which the display electrode 256 constituted of a transparent ITO film is formed but it is reflected from the portion on which the reflection film 259 and a wiring 258 are formed, returned to the light guide plate 27 after passing through the lower polarization plate 24 and recycled. According to the conventional liquid crystal display in which the reflection film 259 is not formed, the light passing between the wiring 258 and the display substrate 256 is applied to and absorbed by the black matrix 232 on the color filter substrate 23 as shown by arrows of an alternate long and short dash line. Therefore, the light passing through the portion is wasted without being used for the liquid crystal display. In the case of the liquid crystal display 20, however, the light is not wasted like the conventional liquid crystal display because the light is reflected from the reflection film 259. Moreover, even if the liquid crystal material is oriented to a not-purposed direction due to the electric field generated between the wiring 258 and the display electrode 256, the light does not pass through the reflection film 259 when the film 259 is formed. Therefore, it is unnecessary to form the black matrix 232 like the conventional liquid crystal display or it is possible to decrease the area for forming the black matrix 232.

The TN-mode liquid crystal display 20 is described above. The second embodiment can also be applied to the IPS-mode liquid crystal display 21. A case in which the second embodiment is applied to the IPS-mode liquid crystal display 21 will be described below by referring to FIGS. 7 and 8. FIG. 7 is a top view showing a single pixel on the array substrate 25 and FIG. 8 is a schematic view of the cross section B-B' in FIG. 7.

As shown in FIG. 8, the liquid crystal display 21 comprises a liquid crystal display panel 21a obtained by superposing an upper polarization plate 22, a color filter substrate 23, a liquid crystal layer 26, an array substrate 25, and a lower polarization plate 24 and a backlight unit 21b constituted of a light source 28 and a light guide plate 27 from the top of FIG. 8.

As shown in FIGS. 7 and 8, a gate electrode 251, a source electrode 252, and a drain electrode 253 are formed on the upper face of the array substrate 25. A display electrode 256 made of a metal film of Al or Ta and electrically connecting with the drain electrode 253 through a display-electrode wiring 256a is formed like a comb on the upper face of the array substrate 25. Moreover, a pectinate common-electrode wiring 257a and a pectinate common electrode 257 are formed by facing the display electrode 256 formed like a comb. The common electrode 257 is made of a transparent conductive film such as ITO or the like.

The predetermined interval is provided between the front end of the display electrode 256 and the common-electrode wiring 257a and between the front end of the common electrode 257 and the display-electrode wiring 256a on the surface of the array substrate 25 respectively and the electric field is generated at the intervals. Therefore, the liquid crystal materials being present in the intervals are oriented to not-purposed directions. That is, the IPS-mode liquid crystal display 21 generates the electric field by applying a voltage between the display electrode 256 and the common electrode 257 on the array substrate 25 to control driving of the liquid crystal material. Therefore, liquid crystal materials driven by the electric fields generated between the front end of the display electrode 256 and the common-electrode wiring 257a and between the front end of the common electrode 257 and the display-electrode wiring 256a are oriented to not-purposed directions. Therefore, because these portions where the electric fields are generated deteriorate display characteristics, they have been excluded from display objects so far by setting the black matrix 232 to an opposite portion on the color filter substrate 23 as shown by the alternate long and short dash line in FIG. 8.

However, in the case of the liquid crystal display 21, the reflection film 259 made of a metal film is formed between the front end of the display electrode 256 and the common-electrode wiring 257a and between the front end of the common electrode 257 and the display-electrode wiring 256a respectively. Therefore, by positively reflecting the light emitted from the light guide plate 27 by the reflection film 259 formed on the array substrate 25 and recycling the light, it is possible to improve the brightness of the liquid crystal display 21.

For the liquid crystal displays 20 and 21 of the second embodiment, an example is described in which the lower polarization plate 24 is set between the array substrate 25 and the light guide plate 27. However, as described for the first embodiment, it is also possible to set the lower polarization plate 24 between the color filter substrate 23 and the array substrate 25. In this case, because the recycling efficiency of the light reflected from the reflection film 259 can be improved, it is possible to make advantages of the second embodiment more remarkable.

Another embodiment will be described below in which the present invention is applied to the above PFA.

FIG. 9 shows a sectional configuration of a liquid crystal display 30 of the third embodiment.

As shown in FIG. 9, the liquid crystal display 30 of this embodiment comprises a liquid crystal display panel 30a constituted of an upper polarization plate 32, a color filter substrate 33, a liquid crystal layer 36 having a liquid crystal material, an array substrate 35 in which a TFT 35T and a wiring 34 are formed on a glass substrate 35a serving as an insulating substrate, a polymer layer 39 formed on the array substrate 35, and a display electrode 40 formed on the polymer layer 39 to electrically connect with the TFT 35T by passing through the polymer layer 39 and a backlight unit 30b constituted of a light guide plate 37 and a light source 38 in order from the top of FIG. 9.

The liquid crystal display 30 is characterized in that polarization elements 39a are dispersed in the polymer layer 39 and therefore, the polymer layer 39 functions as a polarization plate. Thus, because the light reflected from the array substrate 35 is returned to the light guide plate 37 without passing through the polarization elements 39a and recycled, it is possible to control deterioration of the brightness.

In the case of the conventional PFA-type liquid crystal display, the polarization plate is set between the array substrate 35 and the light guide plate 37. Therefore, the light reflected from the array substrate 35 out of the light emitted from the light guide plate 37 returns to the light guide plate 37 after passing through the polarization plate. Because the light is absorbed by the polarization plate as described above, the light returning to the light guide plate 37 is wasted. In the case of the liquid crystal display 30 of this embodiment, however, no polarization plate is present between the light guide plate 37 and the array substrate 35. Therefore, the light recycling efficiency is improved and it is possible to improve the brightness by the value equivalent to improvement of the efficiency.

FIGS. 10A to 10D show schematically each the fabrication steps of the liquid crystal display 30 of this embodiment.

First, as shown in FIG. 10A, the TFT 35T and the wiring 38 are formed on the array substrate 35. It is permitted to form the TFT 35T or the like in accordance with any conventional well-known method.

Then, as shown in FIG. 10B, the polymer layer 39 having a connection hole 39b is formed. Polarization elements 39a are dispersed in the polymer layer 39. To form the polymer layer 39 in which the polarization elements 39a are dispersed, a polymer solution in which the polarization elements 39a are dispersed is applied onto the array substrate 35, spun to arrange molecular axes of the polarization elements 39a and then polymer is heated and solidified. PVA (polyvinyl alcohol) can be used as a polymer for constituting the polymer layer 39. Moreover, it is possible to use an iodine complex for the polarization elements 39a. Moreover, it is possible to use not only the above materials but also other materials for the present invention.

Then, as shown in FIG. 10C, the display electrode 40 is formed on the polymer layer 39. The display electrode 40 can be obtained by sputtering, for example, an ITO target. Thereafter, the separately-formed color filter substrate 33 is attached onto the array substrate 35 through a spacer and a sealing agent (neither spacer nor sealing agent are illustrated). Then, the liquid crystal material is injected into the gap between the array substrate 35 and color filter substrate 33 to form the liquid crystal layer 36. After injecting the liquid crystal material, the upper polarization plate 32 is attached onto the color filter substrate 33. By setting the liquid crystal display panel 30a thus obtained onto the backlight unit 30b, it is possible to obtain the liquid crystal display 30 of this embodiment shown in FIG. 10D.

Though the liquid crystal display 30 has a high light recycling efficiency and is superior in brightness as described above, it moreover has the following advantages. That is, when the wiring 38 on the array substrate 35 and the display electrode 40 are adjacently arranged on the same plane on the array substrate 35, they are easily short-circuited. Even if they are not short-circuited, disclination occurs due to the electric field generated between the wiring 38 and the electrode 40 to deteriorate display quality. However, the liquid crystal display 30 of the subject invention makes it possible to prevent the short circuit from occurring between the wiring 38 and the display electrode 40 because the polymer layer 39 is present between them. Moreover, because the strong electric field in which the liquid crystal material is oriented to a not-purposed direction does not occur between them, the display quality is not deteriorated. In the case of the conventional liquid crystal display in which the wiring 38 and the display electrode 40 are formed on the same plane of the array substrate 35, it is necessary to keep the predetermined distance between the wiring 38 and the display electrode 40 in order to prevent any short circuit or any unnecessary electric field from occurring. This prevents the area of the display electrode 40 from increasing, that is, prevents the aperture ratio from being improved. However, in the case of the liquid crystal display 30 of the subject invention, when horizontally viewing the wiring 38 and display electrode 40, it is unnecessary to keep a distance between them. Therefore, it is possible to increase the area of the display electrode 40, that is, improve the aperture ratio. Moreover, it is unnecessary to set any black matrix.

Additionally, in the case of the conventional PFA-type liquid crystal display, the liquid crystal material nearby the thin film transistor 35T may be oriented to a not-purposed direction by being influenced by the thin film transistor. However, by using the structure in which the thin film transistor 35T is covered with the display electrode 40 like the liquid crystal display 30 of the subject invention, the thin film transistor 35T does not influence the liquid crystal material nearby the thin film transistor. Therefore, it is possible to prevent any not-purposed orientation of the liquid crystal material, that is, disclination.

As described above, the present invention makes it possible to improve the brightness of the liquid crystal display without improving the aperture ratio by not setting the polarization plate between the array substrate and the light guide plate or by recycling the light conventionally absorbed by the black matrix.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the embodiments described above, but encompasses any and all embodiments within the scope of the following claims.

The invention claimed is:

1. A liquid crystal display panel, comprising:
   an array substrate including a driving element for controlling a driving voltage and a display electrode to which a voltage is applied through the driving element are formed;
   a first polarization layer for polarizing the light passing through the array substrate;
   a liquid crystal layer including a liquid crystal material;
   a color filter substrate on which a color filter comprising a color-material film is formed; and
   a second polarization layer for polarizing the light passing through the color filter substrate,
   wherein the array substrate, the first polarization layer, the liquid crystal layer, the color filter substrate, and the second polarization layer are successively superposed.

2. The liquid crystal display panel according to claim 1, wherein a common electrode is formed on the array substrate and an electric field is generated in a direction parallel with the array substrate by applying a voltage between the display electrode and the common electrode.

3. The liquid crystal display device according to claim 1, wherein the array substrate comprises:
   an insulating substrate;
   a thin film transistor formed on the insulating substrate;
   a polymer layer covering the insulating substrate and comprising polarization elements dispersed therein; and
   the display electrode formed on the polymer layer and penetrating the polymer layer, a part of the display electrode conductively connecting with the thin film transistor.

4. The liquid crystal display device according to claim 1, wherein the array substrate comprises at least one of a common electrode, a display electrode, a gate electrode, a source electrode, and a drain electrode interposing the array substrate and the first polarization layer, and
   wherein at least one of the display electrode, the gate electrode, the source electrode, and the drain electrode reflects light emitted from the backlight unit back to the backlight unit.

5. The liquid crystal display device according to claim 4, wherein at least one of the display electrode, the gate electrode, the source electrode, and the drain electrode comprises a reflective metal film.

6. The liquid crystal display panel according to claim 1, further comprising:
   a backlight unit for illuminating the liquid crystal display panel from the outside of the array substrate,
      wherein the backlight unit, the away substrate, the first polarization layer, the liquid crystal layer, the color filter substrate, and the second polarization layer are successively superposed,
      wherein the away substrate comprises:
         an insulating substrate;
         a thin film transistor formed on the insulating substrate;
         a polymer layer covering the insulating substrate and comprising polarization elements dispersed therein;
         a display electrode formed on the polymer layer and penetrating the polymer layer, a part of the display electrode conductively connecting with the thin film transistor; and
         a common electrode formed on the array substrate,
      wherein the common electrode and the display electrode interpose the backlight unit and the first polarization layer,
      wherein the display electrode comprises a reflective metal film that reflects light emitted from the backlight unit back to the backlight unit, and
      wherein the reflected light directly returns to the backlight unit without passing through the polarization layer so as to improve the light-recycling efficiency of the backlight unit, thereby improving a brightness of the liquid crystal display compared to a brightness of a liquid crystal display in which light reflected from the array substrate returns to the backlight unit after passing through a polarization layer.

7. A liquid crystal display device, comprising:
   an array substrate provided with an insulating substrate, a thin film transistor formed on the insulating substrate, a polymer layer which covers the insulating substrate and in which polarization elements are dispersed, and a display electrode which is formed on the polymer layer and penetrates the polymer layer and a part of which conductively connects with the thin film transistor;
   a color filter substrate disposed so as to face the array substrate by keeping a predetermined gap with the array substrate; and
   a liquid crystal layer located at the gap between the array substrate and the color filter substrate; and
   a backlight unit for applying light to a liquid crystal display panel from the outside of the array substrate.

* * * * *